(12) United States Patent
Kowoll et al.

(10) Patent No.: US 8,900,334 B2
(45) Date of Patent: Dec. 2, 2014

(54) METHOD FOR SUPPLYING AN ENTRAINED-FLOW GASIFICATION REACTOR WITH FUEL FROM A STORAGE CONTAINER

(75) Inventors: Johannes Kowoll, Bochum (DE); Stefan Hamel, Wenden (DE); Michael Rieger, Dortmund (DE)

(73) Assignee: ThyssenKrupp UHDE GmbH, Dortmund (DE)

( * ) Notice: Subject to any disclaimer, the term of this patent is extended or adjusted under 35 U.S.C. 154(b) by 664 days.

(21) Appl. No.: 13/138,280

(22) PCT Filed: Dec. 23, 2009

(86) PCT No.: PCT/EP2009/009240
§ 371 (c)(1),
(2), (4) Date: Oct. 6, 2011

(87) PCT Pub. No.: WO2010/086008
PCT Pub. Date: Aug. 5, 2010

(65) Prior Publication Data
US 2012/0111416 A1    May 10, 2012

(30) Foreign Application Priority Data
Jan. 28, 2009  (DE) .......................... 10 2009 006 384

(51) Int. Cl.
C10J 3/46    (2006.01)
C01B 3/02    (2006.01)
C10J 3/50    (2006.01)

(52) U.S. Cl.
CPC .. *C10J 3/50* (2013.01); *C10J 3/466* (2013.01); *C10J 3/506* (2013.01); *C10J 2200/15* (2013.01); *C10J 2200/156* (2013.01); *Y02E 50/32* (2013.01)

USPC ........... 48/197 R; 48/61; 48/127.9; 48/127.1; 48/76; 48/69; 48/195; 48/198.3; 48/127.3; 48/127.5; 48/128; 252/372; 252/373; 252/374; 252/375; 252/376; 252/377

(58) Field of Classification Search
USPC ............. 48/61, 197 R, 127.9, 127.1, 76, 128, 48/200–204
See application file for complete search history.

(56) References Cited

U.S. PATENT DOCUMENTS

2003/0181314 A1*  9/2003  Kranz .............................. 502/34
2006/0074132 A1*  4/2006  Allam et al. .................. 518/702
(Continued)

FOREIGN PATENT DOCUMENTS

DE   36 90 569        11/1987
DE   10 2007 008 690   8/2008
DE   10 2007 020 332  11/2008
(Continued)

OTHER PUBLICATIONS

International Search Report of PCT/EP2009/009240, Sep. 16, 2010.

*Primary Examiner* — Kaity Handal
(74) *Attorney, Agent, or Firm* — Collard & Roe, P.C.

(57) ABSTRACT

The goal of the invention consists in making available a method for supplying fuel to a pressurized gasification system, which ensures, in economically efficient manner, that the emission of pollutants from the coal transfer and the transport is minimized or completely avoided. This is achieved in that a gas that contains at least 10 ppm vol. CO is used for transfer and/or conveying, whereby a gas that contains oxygen is mixed into this gas, and that this gas mixture is heated to a temperature that oxidizes at least 10% of the pollutants contained in the gas.

6 Claims, 3 Drawing Sheets

(56) References Cited

U.S. PATENT DOCUMENTS

| | | |
|---|---|---|
| 2009/0121191 A1* | 5/2009 | Tillman ................. 252/373 |
| 2010/0126068 A1 | 5/2010 | Schingnitz et al. |
| 2010/0147413 A1 | 6/2010 | Schingnitz et al. |
| 2010/0163803 A1 | 7/2010 | Klein |
| 2011/0071229 A1* | 3/2011 | Robertson et al. ............ 518/702 |

FOREIGN PATENT DOCUMENTS

| | | |
|---|---|---|
| DE | 10 2007 020 333 | 11/2008 |
| EP | 0 333 991 | 9/1989 |
| EP | 0 335 071 | 10/1989 |
| GB | 2 192 871 | 1/1988 |
| WO | WO 2007/042562 | 4/2007 |

* cited by examiner

METHOD FOR SUPPLYING AN ENTRAINED-FLOW GASIFICATION REACTOR WITH FUEL FROM A STORAGE CONTAINER

CROSS REFERENCE TO RELATED APPLICATIONS

This application is the National Stage of PCT/EP2009/009240 filed on Dec. 23, 2009, which claims priority under 35 U.S.C. §119 of German Application No. 10 2009 006 384.6 filed on Jan. 28, 2009, the disclosure of which is incorporated by reference. The international application under PCT article 21(2) was not published in English.

BACKGROUND OF THE INVENTION

1. Field of the Invention

The invention is directed at a method for supplying an entrained-flow gasification reactor with fuel from a storage container, with the interposition of at least one transfer container and at least one feed container, whereby gas that contains CO and $H_2$ and flue ash is produced in the entrained-flow gasification reactor.

2. Description of the Related Art

In the transfer and feed of fine-grained to dust-form fuel with a gas that contains carbon dioxide, carbon monoxide, and oxygen, in an entrained-flow gasifier that is under pressure, in which finely divided or dust-form (<0.5 mm) fuels, for example coal, petcoke, biological wastes or fuels, are reacted with gasification agents that contain oxygen, in suspension, at a low particle charge (<50 kg/m3), at elevated pressure up to 10 MPa, at temperatures above the slag melting point, the gas that contains oxygen is supplied at a substoichiometric ratio, so that a product gas that contains carbon monoxide is produced.

Since the fuel is at first present under ambient pressure, it must first be brought to a pressure level above the reactor pressure, by way of the feed system, in order to then be transported to the burners of the pressurized gasification reactor in metered manner.

An advantageous method provides that the fuel is conveyed from a storage container into transfer containers. These are first pressurized to a pressure level above the reactor pressure, in order to then convey the fuel into a feed container for the burners of the gasification reactor, which is permanently under pressure, by way of a conveying line, by means of dense stream conveying. From this feed container, the burners are continuously supplied with a metered fuel mass stream, in each instance. The transport gas required to convey the dense stream is supplied in or in the vicinity of the outlet of the transfer container, or in the conveying line. The emptied transfer containers are then relaxed, in order to be able to take up another fuel batch, under approximately atmospheric pressure. The relaxation gas is dedusted and released into the atmosphere.

Usually, nitrogen from an air separation system or carbon dioxide is used for the transfer. Carbon dioxide is used if the gas to be produced is a synthesis gas low in nitrogen, or hydrogen, and/or CO.

Carbon dioxide can be obtained in the gas treatment that follows gasification. Frequently, the gas that flows out of the gasifier is dedusted and cleaned and subjected to CO conversion, in order to set the $H_2/CO$ ratio required by the synthesis, or in order to produce pure hydrogen. In this connection, CO and steam are converted to $CO_2$ and hydrogen. Afterwards, the gas is cooled, the moisture is condensed out, and subsequently, $CO_2$ is washed out in a washing process with circulating solvents, for example MDEA, Genosorb, or methanol. In a desorber, the $CO_2$ is driven out of the solution by means of lowering the pressure or increasing the temperature. The gas obtained in this manner contains not only the $CO_2$ but also other components, for example $H_2$, CO, $N_2$, methane, hydrogen sulfide, argon, vapors of the solvent used, for example methanol, among other things. The CO content amounts to 0.1%, for example. While it is possible to further lower the content of the pollutants in the washing process, the expenditure (investment costs and operating costs, for example for steam and power consumption) rapidly increases with increasing purity requirements (the production of gas products from raw synthesis gas is described in DE 10 2007 008 690 A1, for example). Removal of CO residues from a $CO_2$ stream is particularly difficult.

DE 10 2407 020 333 A1 describes a method for operation of a dust introduction system for pressurized coal dust gasification, which comprises a storage bunker, dust introduction transfer mechanisms, and a metering vessel. In this connection, heated nitrogen is passed to the bunker, as an inertization and loosening agent, while pressurization of the transfer container and conveying of the dust takes place with pure $CO_2$. The relaxation gas from the transfer container is relaxed and then freed of solids in a filter. In this connection, emptying of the relaxed transfer container into the metering vessel takes place by means of gravity flow.

In DE 36 90 569 C2, a method for removal, from a residual gas, of compounds that contain sulfur is described.

Disadvantages of the known solutions consist, among other things, in that the gas used for transfer and fluidization is allowed to contain only a low concentration of the environmental pollutants CO, $H_2S$, methanol, and others, because it is released into the atmosphere. The transfer based on gravity flow, with the construction of one container on top of another, is complicated because of the great construction height, and has proven to be insufficiently operationally reliable due to compacting of the bulk material. Despite many, extremely varied approaches, it has proven to be extraordinarily difficult to carry out the process of container relaxation in such a gentle manner that internal stresses in the bulk material are kept sufficiently low.

SUMMARY OF THE INVENTION

The task of the invention consists in making available a method for supplying fuel to a pressurized gasification system, which ensures, in economically efficient manner, that the emission of pollutants from the coal transfer and the transport is minimized or completely avoided.

This task is accomplished, according to the invention, with a method of the type indicated initially, in that a gas that contains at least 10 ppm vol. CO (preferably 100 ppm to 1000 ppm) is used for transfer and/or conveying, whereby a gas that contains oxygen is mixed into this gas, and that this gas mixture is heated to a temperature that oxidizes at least 10% of the pollutants contained in the gas.

It has been shown that despite a high concentration of the gases CO, $H_2S$, and the vapors of solvents in gas treatment, such as methanol or the like, the emission of these pollutants from the coal transfer and the transport is greatly reduced by means of the invention, if the emission is not actually completely prevented.

In an embodiment of the invention, it is provided that the gas that contains oxygen and is used for transfer is used for loosening the fuel in the storage container and/or for loosening and fluidizing the content of the transfer container and/or for further conveying out of the transfer container and/or for loosening and fluidization in the feed container for passing the fuel between the system parts and out of the feed container and/or to the entrained-flow gasification reactor.

A particular advantage of the present invention lies in the fact that all the gases used in connection with the transfer and feed of the fuel to the entrained-flow gasification reactor can meet the claimed criteria.

It can be practical if, as the invention also provides, the gas mixture that contains pollutants and oxygen is passed over at least one catalyst for accelerating the oxidation of the pollutants.

Depending on the purpose of use and the design of the corresponding system, it can also be provided, according to the invention, that the gas used for raising the pressure in the transfer container(s) oxidizes catalytically, while the fuel transport gas is not catalytically oxidized.

In a further embodiment, it is provided that a gas having an oxygen content less than 5% is used as the transfer gas, whereby in a further embodiment, it can also be provided that the relaxation gas is passed to the transfer container(s) from the feed container of the pressure stage of a compressor and/or by way of a compression device.

BRIEF DESCRIPTION OF THE DRAWINGS

Additional advantages, details, and characteristics of the invention are evident from the following description and using the drawing. This shows, in FIG. 1 a system schematic for feeding the fuel to a gasification reactor, FIG. 2 a system having the same purpose, having a plurality of feed containers, as well as in FIG. 3 a system essentially according to FIG. 1, with a modified guidance of the gas streams that are used and that occur.

DETAILED DESCRIPTION OF THE PREFERRED EMBODIMENTS

First of all, it should be noted that in the figures, all the elements and flow lines that have the same effect are provided with the same reference symbols in the different schematics, particularly if the corresponding functions in the individual systems are identical or similar.

Figure 1:
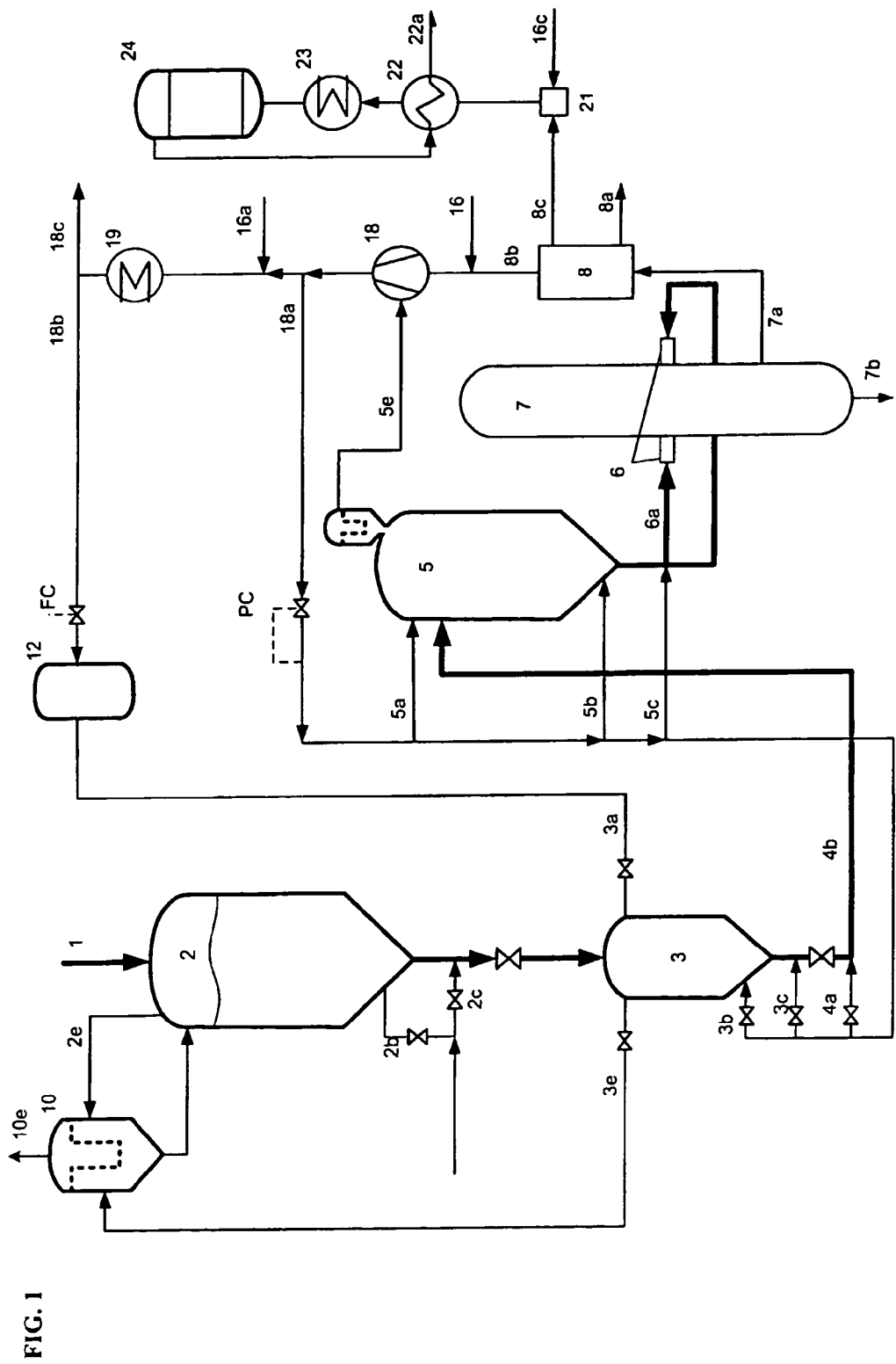

The system schematic according to FIG. 1 shows the fuel feed designated as 1, into a storage container 2, whereby the fuel path, which is shown with a heavy line, leads from the storage container 2 into a transfer container 3, from there, by way of a line 4b, into a feed container 5, and from there, by way of lines 6a, to the burners 6 of the gasification reactor 7.

The gas that flows out when the transfer container is filled is passed to a filter 10, by way of a line 3e, whereby after filtering, the gas is either passed out into the environment, by way of the line 10e, or carried away for further use. The filter dust is passed back into the storage container 2. The gas displaced when filling the storage container 2 is also passed to the filter 10, into the line 2e.

Slag and water that contains solids are passed out of the entrained-flow gasification reactor at 7b, the gas, by way of the line 7a, to a gas treatment 8, whereby the synthesis gas is carried away out of the gas treatment 8 by way of the line 8a.

The carbon dioxide obtained can be divided up into two streams, as shown in FIG. 1, a stream 8b that is passed to compression, and a line 8c that is passed to gas export. According to the invention, a gas that contains oxygen, for example air, is mixed into the gas stream 8b at 16, here, ahead of a compressor 18, or behind the compressor at 16a; cooling takes place in a heat exchanger 19, and the gas is recirculated into the transfer container 3, by way of lines 18b and 3a, respectively, to charge this container.

The method of effect of the system according to FIG. 1 is as follows:

The dust-form fuel 1 is temporarily stored in the storage container 2, and from there transferred to the transfer containers 3 by way of a connecting line. In order to be able to take fuel from the storage container 2, the transfer containers 3 must first be relaxed. The gas 3e that flows out of the transfer containers is dedusted in the filter 10 and released into the atmosphere. Then, the transfer mechanisms are filled with fuel and pressurized with gas 3a and 3b.

Afterwards, the exit line of the transfer mechanism is flushed with 3c and the dust-form fuel is conveyed from the transfer container 3 to the feed container 5, by way of line 4b. In this connection, loosening and fluidization gas 3b and transport gas 4a are added.

The feed container 5 is permanently at operating pressure and continuously supplies the gasifier 7 by way of multiple lines 6a. Conveying out of the feed container takes place by means of adding loosening and fluidization gas 5b into the exit region of the container and additional transport gas 5c into the burner line 6a. The fuel stream 6a is transported into the gasification 7 by way of burners 6, continuously and in regulated manner, by means of dense-stream conveying.

The relaxation gas 5e from the feed container is passed back into a suitable pressure stage of the compressor 18, in order to reduce the required gas amount 8b and the compression power. The gasification 7 comprises a gasification reactor, gas cooling and dedusting, and cooling and discharge of the slag 7b and of the water that contains solids.

In the gas treatment 8, part of the carbon monoxide and part of the steam are converted to carbon dioxide and hydrogen.

Furthermore, the gas is cleaned with a solvent (MDEA or methanol, for example), and carbon dioxide is separated from the synthesis gas 8a (predominantly $H_2$ and CO). The gas that contains carbon dioxide and was obtained in the gas purification has a low pressure and generally contains slight proportions of pollutants, such as, for example, carbon monoxide<1%, hydrogen sulfide<10 ppmv, traces of hydrocarbons, etc.

The carbon dioxide that is obtained can have one or more grades. FIG. 1 shows two $CO_2$ streams, 8b for compression and 8c for export. Frequently, the export stream is allowed to contain CO, $H_2S$, and methanol, for example if the gas is used for displacement of crude oil underneath the earth's surface. If the pollutant content is supposed to be reduced in this stream, as well, this can also take place by means of oxidation, as shown in FIG. 1.

A gas 16c that contains oxygen, preferably air, is mixed into the impure $CO_2$ stream, and the temperature of the mixture is raised in heat exchangers 22 and 23, in order to oxidize the pollutants in the reactor 24, preferably catalytically. After cooling in the heat exchanger 22, the low-pollutant gas 22a can be released or reused.

The stream 8b is compressed in the compressor 18 and used for transfer, fluidization, and pneumatic transport of the fuel into the gasifier. Part of this gas is given off into the environment; in the exemplary embodiment in FIG. 1, this is the stream 10e.

In order to reduce emission of pollutants into the atmosphere, a gas 16 that contains oxygen is mixed into the gas 8b that contains pollutants, and the mixture is compressed, in adiabatic or polytropic manner, with only slight intermediate cooling.

Alternatively, the oxygen addition, stream 16a, can take place after compression 18. The compressed, hot gas can optionally be heated further with heat exchangers (not shown) and dwell at the temperature for a certain time, so that the pollutants, particularly CO and methanol, can react with the oxygen contained in the gas mixture. While a high temperature of the transfer and transport gas is thermodynamically practical, it makes distribution of the gas more difficult and causes degassing of fuel particles, and therefore additional emissions can occur. For this reason, the gas can be cooled in the heat exchanger 19, for example an evaporator, to the desired temperature.

Mixing the oxygen 16 in ahead of the compressor 18 brings about a further advantage in the gasifier. Usually, the gasification media fuel 6a and oxygen are fed into the gasifier by means of separate, concentric channels of the burners 6, and at first form separate strands in the gasifier, which are gradually mixed with one another.

The reaction speed of the oxygen with the hot gas in the gasifier is several orders greater than that with the fuel, which is relatively cold, at first, so that the predominant part of the oxygen reacts with the gas, causing an extremely hot gas flame and a relatively long fuel strand to be formed. Only by means of mixing and radiation is the fuel temperature raised, so that gasification of the fuel can take place.

If, in contrast, part of the oxygen is fed in together with the fuel, the exothermic oxygen reactions take place in the immediate vicinity of the fuel particles, and thereby the cold fuel strand and thus also the flame are shortened. The practical consequences are a higher fuel reaction rate and a greater gasifier output, since the maximal fuel throughput of a gasification burner is generally limited by the flame length.

Figure 2:
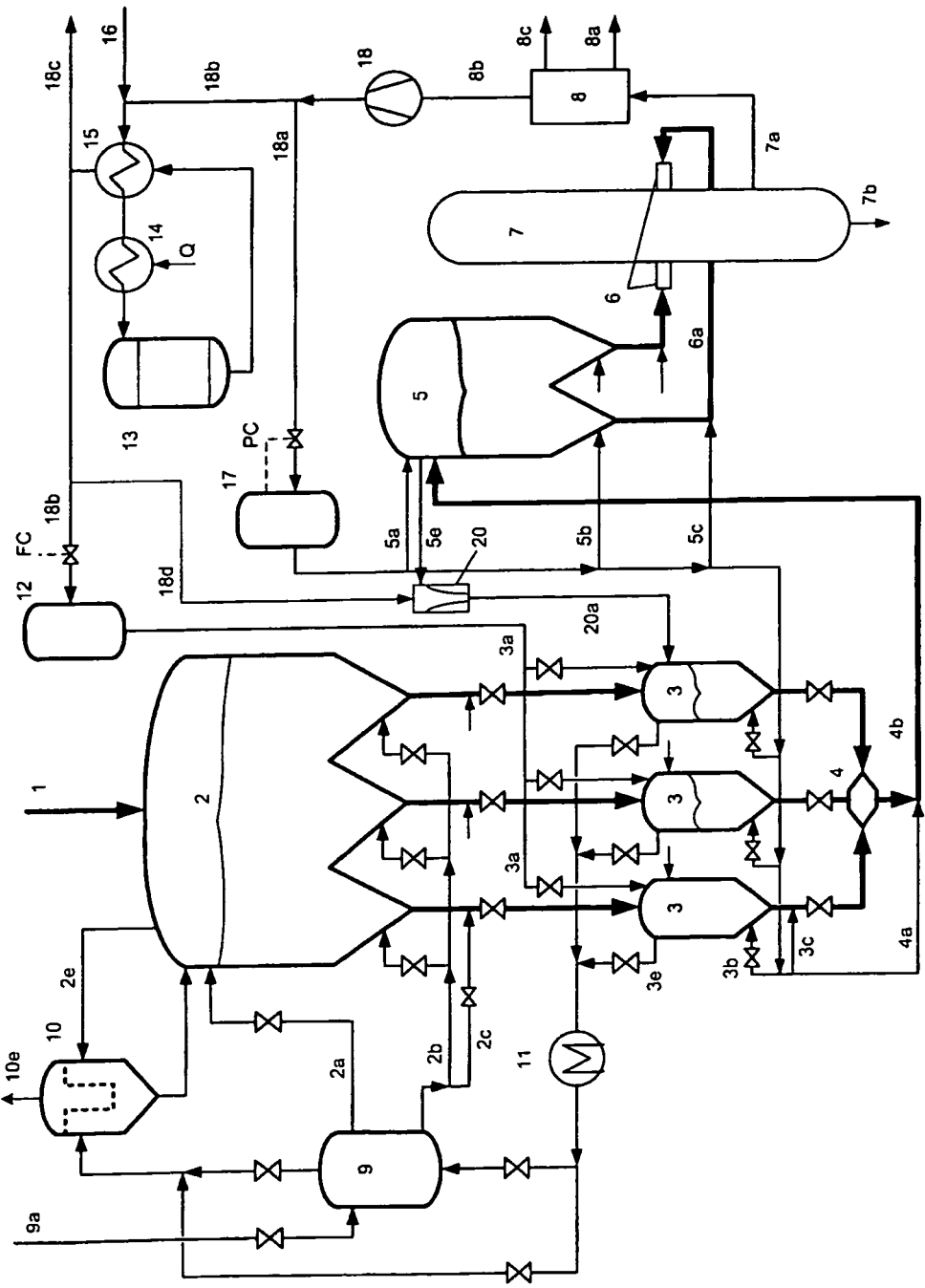

FIG. 2 shows an alternative embodiment, in greater detail, of the emission-reducing fuel transfer and conveying, whereby, as was already mentioned above, functionally equivalent system parts have the same reference symbols as in FIG. 1.

The dust-form fuel 1 is temporarily stored in the storage container 2 and transferred to three transfer containers 3, for example, from there, by way of connecting lines. The lines are flushed with 2c before the transfer valves are opened. During the filling process of the transfer mechanisms, fluidization gas 2b is fed into the discharge cones of the storage container. The transfer containers are used with time offset, to convey the fuel, so that a quasi-continuous supply to the feed container 5 occurs.

The transfer containers, filled with fuel, are pressurized with 3a and 3b. Then, the fuel is transported into the feed container 5, whereby fluidization gas 3b can be fed into the run-out cones, and transport gas 3c and 4a are fed in. Afterwards, the emptied containers are relaxed by way of 3e. The relaxation gases 3e are heated in the heat exchanger 11, for example, in order to avoid icing and condensation during the relaxation and in the filter 10. The gases can be partly collected in the buffer 9 and used further, for example in the storage container, streams 2a, 2b, 2c, and for inertization of the grinding system. At least a part of the gases is dedusted in the filter 10 and released into the atmosphere. The buffer 9 is additionally supplied with the gas 9a, for example during the startup phase. A part of the transport gas carried into the feed container 5 with the fuel is also passed away by way of 5e.

The pressure of the relaxation gases 5e is raised using a compression device, for example an injector, which is driven with propellant gas 18d, so that the gases can be returned into the transfer mechanism or used as transport gas.

The cold gas 8b that is separated in the gas treatment 8 and predominantly contains $CO_2$ is compressed, whereby a compressor with intermediate-stage cooling is used in order to reduce the compression power. Part of the compressed gas, for example having the parameters 60 bar and 100° C., is fed into the buffer 17, in which a constant pressure is regulated with PC (pressure control), and then used in the fuel conveying between the exit cones of the transfer mechanisms and the gasifier.

Since a large part of the gas fed into the fuel conveying flows into the gasifier, and only a small part flows into the environment, the pollutants CO, methanol, and others in streams 3b, 3c, 4a, 5a, 5b, 5c can frequently be accepted. In contrast, a gas 16 that contains oxygen is mixed into the gas stream 18b that is used in the transfer system.

In order to accelerate oxidation of the pollutants, the mixture can be heated, for example in a gas/gas heat exchanger 15, and heated further in a heater 14 heated with external heat Q, and contacted with a catalyst 13. In addition, the gas is heated by means of exothermic oxidation, so that the heat exchanger 14 can be eliminated if the concentration of the oxidizable substances $H_2$, CO, $H_2S$, and others is sufficiently high, for example >1%. The gas is heated up to 190° C. in the heat exchanger 15, for example, and up to 220° C. in the heater 14. In the catalytic reactor 13, CO, methanol, and others are converted to clearly less toxic gases.

The gas that flows out of the reactor 13 is cooled to approximately 130° C. in the heat exchanger 15 and passed into the buffer 12. An approximately constant, average through-flow is set using a regulator FC (flow control). The great variations in demand of the transfer system therefore do not cause any through-flow variations in the reactor 13.

The gas 20a, which is recirculated and compressed, can alternatively be used as a transport gas 4a and 5c or as a fluidization gas.

The optimal parameters of the oxidation of CO, methanol, and others, the temperature, the oxygen concentration, the catalyst amount, or the dwell time in the high temperature range, if no catalyst is used, must be determined by means of an efficient analysis. Since the required dwell time and the catalyst amount are reduced with an increasing oxygen concentration, an optimum can be expected in the case of oxygen excess. However, high oxygen concentrations in the transfer gas can lead to ignition and explosion of the mixture with dust-form fuel, particularly when using reactive fuels such as bituminous coal or biological fuels. Therefore the oxygen concentration should not be higher than 5%.

Figure 3:
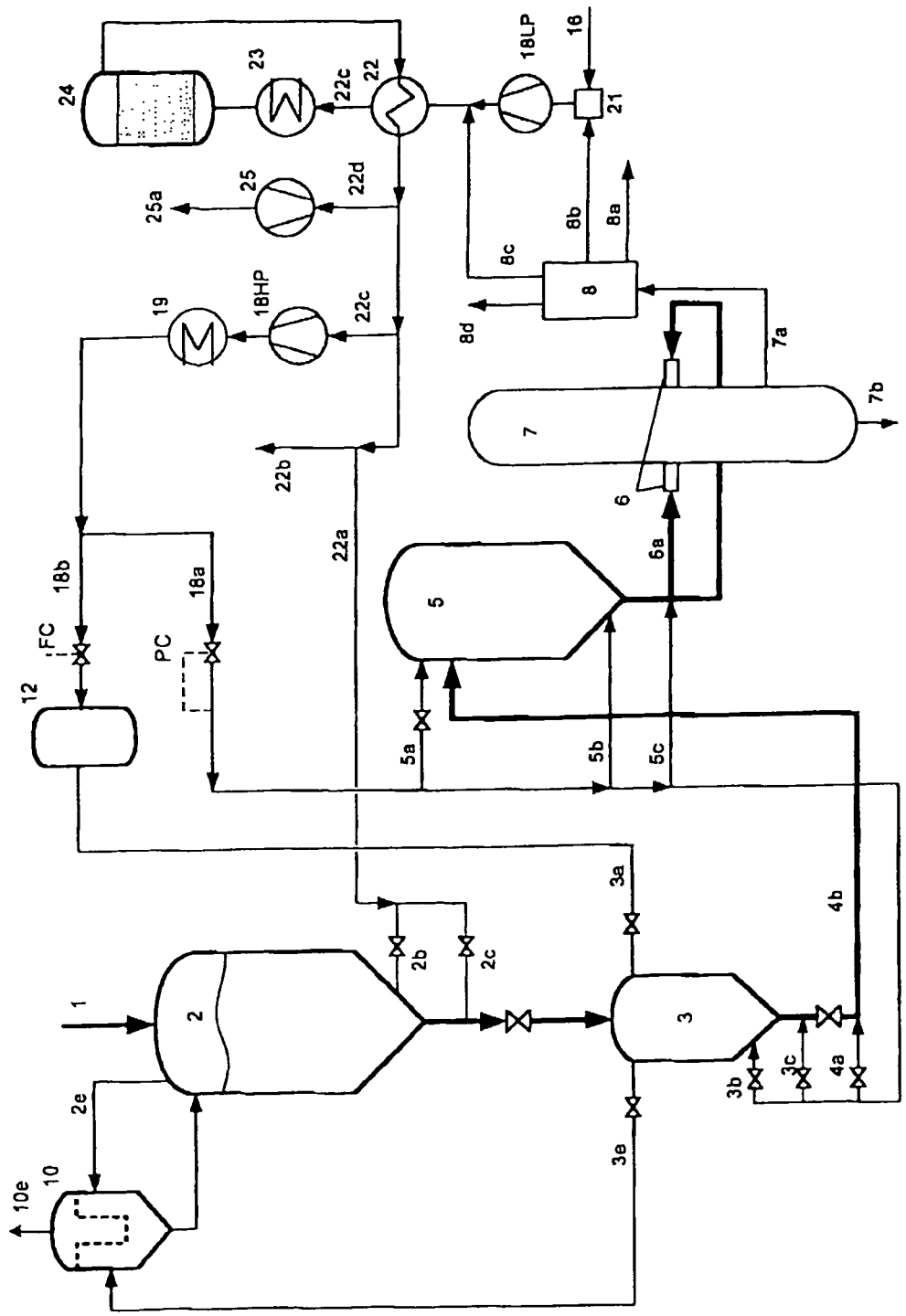

FIG. 3 shows another variant of the reduction in emissions according to the invention, with three $CO_2$ fractions at different pressures. Here, the oxygen stream 16 is mixed into the fraction 8b having the lowest, for example approximately atmospheric pressure, the mixture is compressed, in adiabatic manner, up to the pressure of the second fraction 8c, for example 5 bar in 18 LP, thereby heating the gas to approximately 200° C. and mixing it with 8c.

Optionally, the mixture can be heated further in 22 and 23. Then, oxidation of the pollutants takes place in 24, and recovery of the heat in 22. The low-pressure gas, freed from most of the pollutants, is used in the low-pressure part of the coal treatment 22a, by other consumers 22b, in the transfer and conveying 22c after prior compression in the high-pressure compressor 18HP; in contrast, the rest is relaxed in the expander 25, whereby mechanical or electrical energy is recovered.

The relaxed gas 25a can be used for inertization of the coal grinding system, for example, or released into the atmosphere. Additional heat exchangers, for example for heating the streams 8c, 22d, 25a, or cooling the streams 18a, 18b, 22a to 22c, should be considered, taking the technical and economic aspects into consideration. A part of the gas 8*d* produced in the gas treatment 8, consisting predominantly of $CO_2$, has no gas containing oxygen mixed into it. This gas, if applicable after compression, is exported and/or used downstream from the gasifier, for example in gas dedusting, flue ash treatment, and as flushing or barrier gas, in order to avoid losses of useful gas by means of oxidation of $H_2$ and CO.

During relaxation of the transfer mechanism 3, the gas is clearly cooled due to the isentropic or polytropic relaxation, and thereby ice formation from the steam that comes from the residual moisture of the coal and condensation of $CO_2$ could disrupt the process. Furthermore, the transfer container is cyclically confronted with low temperatures, causing the container wall to be mechanically stressed, which leads to fatigue of the material in the case of a cyclical process. In order to avoid this, the transfer container is heated from the outside, electrically or using a medium. Other apparatuses of the fuel conveying system 2, 4, 5, 9, 10, and the connecting pipelines should also be heated, in order to avoid dropping below the dew point.

In the figures, advantageous embodiments of the invention are shown as examples, in order to illustrate the path of the pollutants all the way into the atmosphere and the method for reducing emissions. The restriction of emissions according to the invention can also be used for alternative embodiments of the fuel feed and conveying, the gasification, and the gas treatment, for example

- gravitation flow of the fuel out of the transfer container 3 into the feed container 5,
- without the LP buffer 9 or multiple buffers at different pressures,
- multiple storage containers and/or multiple feed containers,
- gasification using waste heat boilers, dry dust precipitation, and use of the recirculated gas as a quenching gas,
- gasification with water quench and wet dust precipitation,
- CO conversion in the gas that contains $H_2S$ from the gasification, or first desulfurization of the gas and then dampening and CO conversion,
- feed of the gas that contains oxygen ahead of the compressor 18, after the compressor, or after partial compression,
- without the heat exchanger 15 and with a gas cooler, for example steam generator, between 13 and 12,
- only one $CO_2$ stream leaves the gas treatment; gas that contains oxygen is mixed into this stream, and part of the mixture is compressed and oxidized under high pressure, while the other part is treated under low pressure,
- only one $CO_2$ stream 8*c* leaves the gas treatment; gas 16*c* that contains oxygen is mixed into this stream, the mixture is heated with 22 and 23, and pollutants are catalytically oxidized, and part of the cooled gas 22*a* is passed to the compressor 18, while the rest is exported.

The gas 16 that contains oxygen can have the same composition as the oxygen stream for the gasifier. A gas obtained cryogenically, which contains 85 to 99.8% $O_2$, up to 3% Ar, and nitrogen, is usual in gasification. However, air, air enriched with oxygen, or nitrogen having an oxygen content of 2%, for example, can also be used.

Since the gas 8*b*, which consists predominantly of carbon dioxide, is generally obtained, in gasification systems, from the subsequent gas scrubber, an imported gas is necessary for startup operation of the overall system, for example $CO_2$ or nitrogen. Frequently, the use of nitrogen is preferred, which can be supplied in the liquid phase for this purpose, for example. As soon as operation has started to such an extent that the carbon dioxide is separated in the gas purification, a switch to gas that contains carbon dioxide takes place for further regular operation.

The stream 18*c* shows that the compressed, low-pollutant gas 18 can also be used for other purposes, for example as a transfer and flushing gas in flue ash treatment. An export gas at average pressure can be withdrawn from the buffer 9, and the stream 10*e* is available at slight excess pressure.

The embodiment of the storage container 2, the transfer containers 3, and the further-conveying line 4*b* shown in FIG. 2 is an example that is used here to represent the basic sequences. It is provided that the number of transfer containers can be greater. It is also provided that the transfer containers supply the feed container 5 by way of multiple further-conveying lines.

REFERENCE SYMBOL LIST

1 fuel
2 storage container
3 transfer container
4 combining element
5 feed container
6 burner
7 gasification reactor, gas cooling and dedusting
8 gas treatment
9 gas buffer
10 filter
11 gas heater
12, 17 HP buffer container
13, 24 catalytic reactor
14, 23 gas heater
15, 22 gas/gas heat exchanger
16, 16*a* gas that contains oxygen
18 compressor
19 gas cooler
20 injector or compressor
21 gas mixer
2*b*, 3*b*, 5*b* gas for loosening and fluidization
2*c*, 3*c*, 4*a*, 5*c* additional transport gas
2*e*, 3*e*, 5*e* relaxation gas
3*a* transfer gas
5*a* gas for maintaining pressure
8*a* predominantly $H_2$ and CO or only $H_2$
8*b*, 8*c* impure $CO_2$
18*a* fluidization and transport gas
18*b* transfer gas

The invention claimed is:

1. Method for supplying an entrained-flow gasification reactor with fuel from a storage container, with at least one transfer container and at least one feed container being disposed between the entrained-flow gasification reactor and the storage container,
   wherein a reactor gas that contains CO and $H_2$ and flue ash is produced in the entrained-flow gasification reactor,
   wherein the reactor gas leaves the entrained-flow gasification reactor and is treated in a gas treatment unit to form a treated gas, wherein a first gas that contains at least 10 ppm vol. CO is separated from the treated gas,
   wherein the first gas that contains at least 10 ppm vol. CO is used for transfer and/or conveying,
   wherein a second gas that contains oxygen is mixed into the first gas to form a gas mixture,
   wherein the gas mixture is heated to a temperature that oxidizes at least 10% of the CO contained in the gas mixture to form an oxidized gas mixture, and wherein the oxidized gas mixture is at least partially released into the atmosphere.

2. Method according to claim 1, wherein gas that contains oxygen and is used for transfer is used for loosening the fuel in the storage container and/or for loosening and fluidizing the content of the transfer container and/or for further conveying out of the transfer container and/or for loosening and fluidization in the feed container for passing the fuel between the system parts and out of the feed container and/or to the entrained-flow gasification reactor.

3. Method according to claim 1,
wherein downstream from the entrained-flow gasification reactor the gas mixture is passed over at least one catalyst for accelerating the oxidation of the CO to help form the oxidated gas mixture.

4. Method according to claim 3, wherein the oxidated gas mixture is used for raising the pressure in the transfer container, while a fuel transport gas is not catalytically oxidized.

5. Method according to claim 1, wherein a gas having an oxygen content less than 5% is used as a transfer gas.

6. Method according to claim 1, wherein relaxation gas from the feed container is passed to a pressure stage of a compressor and/or is passed by way of a compression device to the transfer container.

* * * * *